(12) United States Patent
Zhang et al.

(10) Patent No.: US 11,983,144 B2
(45) Date of Patent: May 14, 2024

(54) DYNAMIC SNAPSHOT SCHEDULING USING STORAGE SYSTEM METRICS

(71) Applicant: Dell Products L.P., Round Rock, TX (US)

(72) Inventors: Yang Zhang, Chengdu (CN); Allen Zhao, Chengdu (CN); Jingyi Wang, Chengdu (CN); Shuangshuang Liang, Zunyi (CN)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 17/582,597

(22) Filed: Jan. 24, 2022

(65) Prior Publication Data

US 2023/0222094 A1 Jul. 13, 2023

(30) Foreign Application Priority Data

Jan. 13, 2022 (CN) .......................... 202210038374.7

(51) Int. Cl.
*G06F 16/00* (2019.01)
*G06F 11/14* (2006.01)
*G06F 16/11* (2019.01)

(52) U.S. Cl.
CPC ........ *G06F 16/128* (2019.01); *G06F 11/1461* (2013.01); *G06F 16/125* (2019.01)

(58) Field of Classification Search
None
See application file for complete search history.

(56) References Cited

U.S. PATENT DOCUMENTS

| 7,908,436 B1 | 3/2011 | Srinivasan |
| 8,977,594 B2 * | 3/2015 | Whitehead .............. H04L 67/01 707/639 |
| 9,390,116 B1 | 7/2016 | Li |

(Continued)

OTHER PUBLICATIONS

Agarwal et al., "EBS Snapshot Scheduler—AWS Implementation Guide", Oct. 2016 by Amazon.com, Inc. or its affiliates; https://docs.aws.amazon.com/solutions/latest/ebs-snapshot-scheduler/welcome.html, downloaded on Dec. 14, 2021.

(Continued)

*Primary Examiner* — Farhan M Syed
(74) *Attorney, Agent, or Firm* — Ryan, Mason & Lewis, LLP

(57) ABSTRACT

Dynamic snapshot scheduling techniques are provided using storage system metrics. One method comprises obtaining a schedule for generating snapshots of a portion of a storage system; automatically adjusting snapshot generation parameters in the schedule based on: (i) a current storage pool usage metric, (ii) an input/output metric of at least one storage resource in the portion of the storage system, (iii) a measure of snapshots in a destroying state, and/or (iv) a measure of a number of created snapshots; and initiating a generation of a snapshot of the storage system portion in accordance with the adjusted schedule. A snapshot generation frequency may be increased in response to an increase of: the current storage pool usage metric, the number of snapshots in the destroying state, and/or the number of created snapshots. A snapshot generation frequency may be decreased in response to an increase of the I/O metric of the at least one storage resource.

20 Claims, 8 Drawing Sheets

(56) References Cited

U.S. PATENT DOCUMENTS

| | | |
|---|---|---|
| 9,569,357 B1 | 2/2017 | Shalev |
| 10,210,048 B2 | 2/2019 | Sancheti |
| 10,365,976 B2 | 7/2019 | Ren et al. |
| 10,691,551 B2 | 6/2020 | Meiri et al. |
| 2010/0211616 A1 | 8/2010 | Khandelwal |
| 2014/0108351 A1* | 4/2014 | Nallathambi ....... G06F 11/1464 707/639 |
| 2014/0181027 A1* | 6/2014 | Whitehead .......... H04L 67/1095 707/639 |
| 2015/0301900 A1* | 10/2015 | Whitehead ............ G06F 16/178 709/219 |
| 2015/0347548 A1* | 12/2015 | Mortensen .......... G06F 16/2365 707/618 |
| 2019/0042134 A1 | 2/2019 | Nishizono |
| 2021/0034240 A1* | 2/2021 | Wang .................... G06F 3/0649 |
| 2021/0373815 A1 | 12/2021 | Kumar et al. |

OTHER PUBLICATIONS

"Scheduling of Snapshots", 2021 Red Hat, Inc.; https://access.redhat.com/documentation/en-us/red_hat_gluster_storage/3.1/html/administration_guide/ch16s12, downloaded on Dec. 14, 2021.

"Storage Policy Snapshot", 1997-2020 Commvault Systems, Inc.; https://documentation.commvault.com/commvault/v11/article?p=60105_1.htm, downloaded on May 27, 2020.

"Managing Snapshots", 2020, Oracle and/or its affiliates; https://docs.cloud.oracle.com/en-us/iaas/Content/File/Tasks/managingsnapshots.htm, downloaded on May 27, 2020.

\* cited by examiner

| STORAGE SYSTEM METRIC | METRIC SHORT NAME | METRIC DESCRIPTION |
|---|---|---|
| P | CURRENT STORAGE POOL USAGE METRIC | AMOUNT OF STORAGE SPACE ALLOCATED RELATIVE TO A CAPACITY OF STORAGE SPACE IN THE STORAGE SYSTEM |
| R | STORAGE RESOURCE INPUT/OUTPUT METRIC | NUMBER OF INPUT/OUTPUT OPERATIONS OF THE AT LEAST ONE STORAGE RESOURCE OF THE STORAGE SYSTEM RELATIVE TO A NUMBER OF INPUT/OUTPUT OPERATIONS OF THE STORAGE SYSTEM |
| DS | DESTROYING STATE SNAPSHOT MEASURE | NUMBER OF SNAPSHOTS IN THE DESTROYING STATE RELATIVE TO A TOTAL NUMBER OF CREATED SNAPSHOTS |
| S | NUMBER OF CREATED SNAPSHOTS MEASURE | TOTAL NUMBER OF CREATED SNAPSHOTS RELATIVE TO A MAXIMUM NUMBER OF CREATED SNAPSHOTS |

FIG. 3

STORAGE-SIDE SCHEDULING PROCESS 500

1. WHEN $F_{min}$ IS REACHED, OBTAIN FOUR STORAGE SYSTEM METRICS: P, R, DS, S;

2. IF P ≥ PWM, LET $y_1$ = 1 AND $y_2$ = 0, SO $F_{actual}$ = $F_{max}$, THEN GO TO END AND WAIT FOR NEXT EVALUATION; ELSE GO TO STEP 3

3. IF S = 1, LET $y_1$ = 1 AND $y_2$ = 0, SO $F_{actual}$ = $F_{max}$, THEN GO TO END AND WAIT FOR NEXT EVALUATION; ELSE GO TO STEP 4

4. CALCULATE $y_1$ AND $y_2$:
   $y_1$ = 1/3 × (P + S + DS)
   $y_2$ = R,
   THEN, EVALUATE $F_{actual}$ AND CREATE NEW SNAPSHOT WHEN $F_{actual}$ IS REACHED

FIG. 5

DYNAMIC SNAPSHOT SCHEDULING USING STORAGE SYSTEM METRICS

RELATED APPLICATION(S)

The present application claims priority to Chinese Patent Application No. 202210038374.7, filed Jan. 13, 2022, and entitled "Dynamic Snapshot Scheduling Using Storage System Metrics," which is incorporated by reference herein in its entirety.

FIELD

The field relates generally to information processing techniques and more particularly, to techniques for protecting information.

BACKGROUND

Snapshots are utilized by information processing systems to save a state of a storage system at a given point in time. A user typically specifies a snapshot schedule that determines when a snapshot of one or more target logical volumes is created, using a technique that is sometimes referred to as snapshot scheduling. When snapshot scheduling is used, however, a new snapshot is typically created strictly according to the schedule. Such a snapshot may result in inadequate data protection, reduced storage system performance and/or a waste of storage system resources.

A need exists for improved techniques for scheduling snapshots.

SUMMARY

In one embodiment, a method comprises obtaining a schedule for generating snapshots of at least a portion of a storage system; automatically adjusting one or more snapshot generation parameters in the schedule based at least in part on at least one of: (i) a current storage pool usage metric, (ii) an input/output metric of at least one storage resource in the portion of the storage system, (iii) a measure of snapshots in a destroying state, and (iv) a measure of a number of created snapshots; and initiating a generation of a snapshot of the at least the portion of the storage system in accordance with the adjusted schedule.

In some embodiments, the one or more snapshot generation parameters comprise a snapshot generation frequency that is maintained within a range specified by a user. The adjusting may comprise increasing the snapshot generation frequency in response to an increase of one or more of: the current storage pool usage metric, the measure of snapshots in the destroying state, and the measure of the number of created snapshots. The adjusting may also comprise decreasing the snapshot generation frequency in response to an increase of the input/output metric of the at least one storage resource in the portion of the storage system.

Other illustrative embodiments include, without limitation, apparatus, systems, methods and computer program products comprising processor-readable storage media.

BRIEF DESCRIPTION OF THE DRAWINGS

FIG. 3 is a sample table illustrating a number of exemplary storage system metrics, in accordance with an illustrative embodiment;

FIG. 5 illustrates exemplary pseudo code for a storage-side I/O scheduling process, in accordance with an illustrative embodiment;

DETAILED DESCRIPTION

Figure 1:
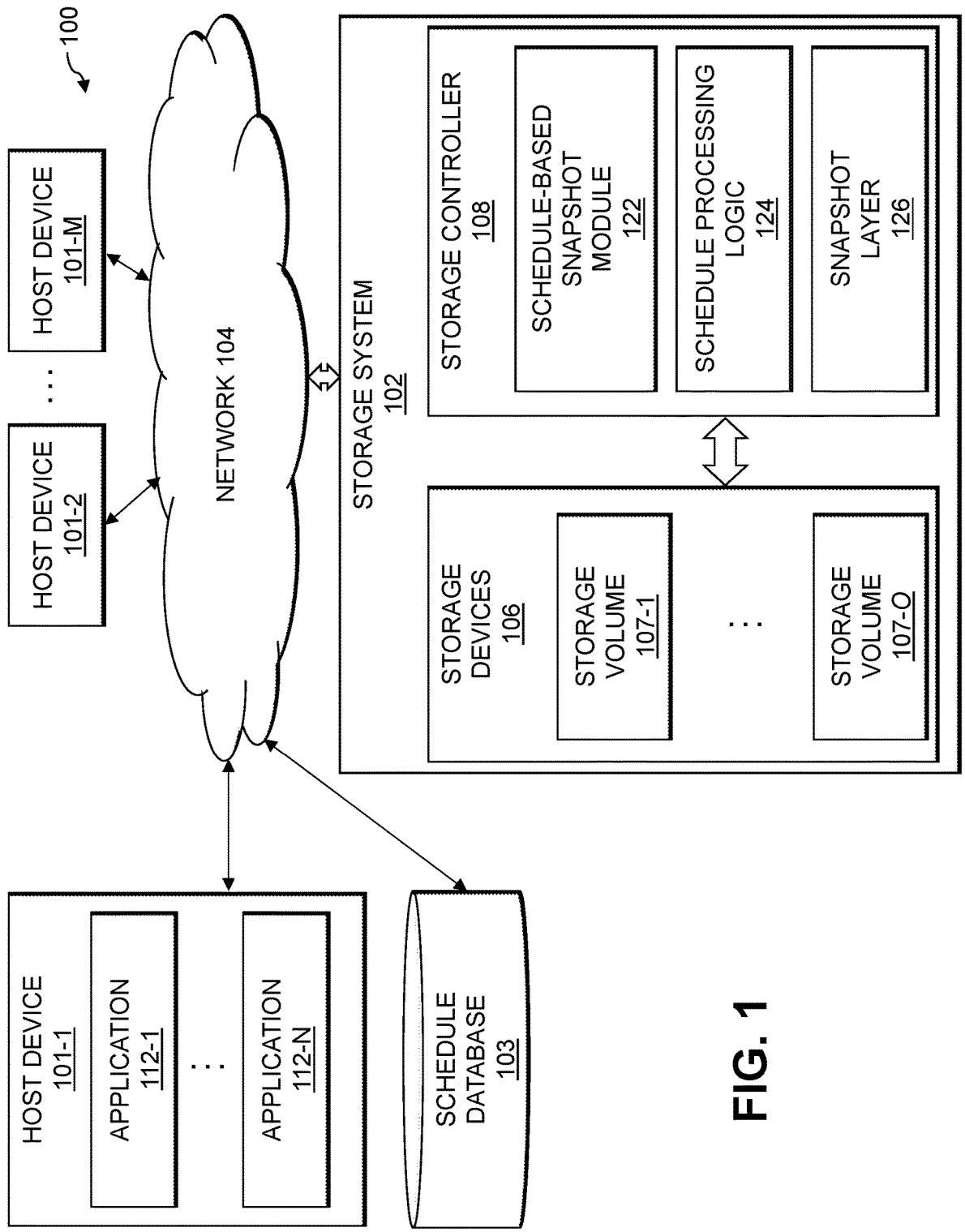
FIG. 1 shows an information processing system configured for dynamic snapshot scheduling using storage system metrics, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for dynamic snapshot scheduling using storage system metrics.

As noted above, snapshot scheduling specifies when a snapshot of one or more target logical volumes is automatically created. A snapshot schedule enables a user to trigger the storage system to periodically perform snapshots of the data within a storage resource. A user may create a custom snapshot schedule by specifying a time interval, times of day, and/or days at which snapshots should be performed, and how long a snapshot should be retained. A snapshot schedule allows users to automatically trigger snapshots when the storage system has a large number of objects requiring snapshot protection.

For some users, however, the schedule frequency is set too short by the user, for example, due to inexperience. When the schedule frequency is set too short, it may result in a snapshot limit being reached, which impairs data protection when a new snapshot cannot be created. In addition, workloads are often different at different times of day, or on different days. Thus, following an identical snapshot schedule at all times is not recommended. Further, a snapshot deletion process may be time and/or resource intensive. In addition, there may be many instances of a snapshot deletion process running in a short period of time, which will impair system performance.

In one or more embodiments, a dynamic snapshot scheduling approach is provided that evaluates an overall state of the storage system by considering one or more storage system metrics. In at least some embodiments, the considered storage system metrics comprise: (i) a current storage pool usage metric, (ii) an input/output metric of at least one storage resource in at least a portion of the storage system, (iii) a measure of snapshots in a destroying state, and/or (iv) a measure of a number of created snapshots in the storage space of the system.

As discussed further below, for example, in conjunction with the example of FIG. 3, the current storage pool usage metric comprises an amount of storage space allocated relative to a capacity of storage space in the storage system; the input/output metric comprises a number of input/output operations of the at least one storage resource of the storage system relative to a number of input/output operations of the storage system; the measure of snapshots in the destroying state comprises a number of snapshots in the destroying state relative to a total number of created snapshots; and the measure of the number of created snapshots comprises the total number of created snapshots relative to a maximum number of created snapshots.

In one or more embodiments, a user configures a snapshot schedule range (e.g., a minimum and maximum snapshot schedule frequency) in a storage system, or a default schedule range may be employed when a user does not specify a particular schedule range. The disclosed techniques for dynamic snapshot scheduling monitor the one or more storage system metrics and adapt the snapshot schedule frequency, in at least some embodiments, within the configured or default snapshot schedule range.

FIG. 1 shows an information processing system 100 configured in accordance with an illustrative embodiment. The information processing system 100 comprises a plurality of host devices 101-1, 101-2, . . . 101-M, collectively referred to herein as host devices 101, and a storage system 102. The host devices 101 are configured to communicate with the storage system 102 over a network 104. The host devices 101 illustratively comprise servers or other types of computers of an enterprise computer system, cloud-based computer system or other arrangement of multiple compute nodes associated with respective users. Host device 101-1 is representative of one or more of the host devices 101. As shown in FIG. 1, the representative host device 101-1 executes one or more applications 112-1 through 112-N, collectively referred to herein as applications 112.

For example, the host devices 101 in some embodiments illustratively provide compute services such as execution of one or more applications 112 on behalf of each of one or more users associated with respective ones of the host devices. Such applications 112 illustratively generate input-output (I/O) operations that are processed by the storage system 102. The term "input-output" as used herein refers to at least one of input and output. For example, I/O operations may comprise write requests and/or read requests directed to logical addresses of a particular logical storage volume of the storage system 102. These and other types of I/O operations are also generally referred to herein as I/O requests.

In some embodiments, each exemplary application 112 comprises a multi-path input-output (MPIO) driver (not shown in FIG. 1) configured to control delivery of I/O operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The host devices 101 and/or applications 112 are configured to interact over the network 104 with the storage system 102. Such interaction illustratively includes generating I/O operations, such as write and read requests, and sending such requests over the network 104 for processing by the storage system 102. As discussed hereinafter, an MPIO driver associated with each application 112 may comprise, for example, an otherwise conventional MPIO driver. Other types of MPIO drivers from other driver vendors may be used.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The storage system 102 comprises a plurality of storage devices 106 and an associated storage controller 108. The storage devices 106 store data of a plurality of storage volumes 107-1 through 107-O. The storage volumes 107 illustratively comprise respective logical units (LUNs) or other types of logical storage volumes. The term "storage volume" as used herein is intended to be broadly construed, and should not be viewed as being limited to any particular format or configuration.

In one or more embodiments, the disclosed techniques for dynamic snapshot scheduling using metrics of the storage system 102 are illustratively performed at least in part by the storage controller 108, in a manner to be described in more detail elsewhere herein. In the example of FIG. 1, the exemplary storage controller 108 comprises a schedule-based snapshot module 122, schedule processing logic 124 and a snapshot layer 126. In some embodiments, the schedule-based snapshot module 122 determines when to take snapshots based on a schedule established using the disclosed dynamic snapshot scheduling techniques, as discussed hereinafter. The exemplary schedule processing logic 124 processes the determined schedule frequency adjustments that are used to trigger a snapshot when a corresponding time threshold is satisfied. Once a snapshot is triggered using the disclosed dynamic snapshot scheduling techniques, the snapshot layer 126 implements the snapshot, for example, in a conventional manner.

The storage controller 108 and the storage system 102 may further include one or more additional modules and other components typically found in conventional implementations of storage controllers and storage systems, although such additional modules and other components are omitted from the figure for clarity and simplicity of illustration.

Additionally, the host devices 101 and/or the storage system 102 can have an associated schedule database 103 configured to store storage system metrics, as discussed further below in conjunction with FIG. 3, for example. The schedule database 103 in the present embodiment can be implemented using one or more storage systems associated with the host devices 101 and/or the storage system 102, or the schedule database 103 can be accessed over the network 104. Such storage systems can comprise any of a variety of different types of storage including network-attached storage (NAS), storage area networks (SANs), direct-attached storage (DAS) and distributed DAS, as well as combinations of these and other storage types, including software-defined storage.

The host devices 101 and the storage system 102 may be implemented on a common processing platform, or on separate processing platforms. The host devices 101 are illustratively configured to write data to and read data from the storage system 102 in accordance with applications 112 executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

In one or more embodiments, a user configures a schedule range (e.g., a minimum and maximum schedule frequency) in the storage system 102, for example, using a graphical user interface (GUI) and/or an application programming interface (API) provided by the storage system 102. In some embodiments, a default schedule range may be employed when a user does not specify a particular schedule range.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage devices 106 of the storage system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 102.

It is therefore to be appreciated that numerous different types of storage devices 106 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system. A wide variety of other types of distributed or non-distributed storage arrays can be used in implementing the storage system 102 in other embodiments. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, SANs, DAS and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement I/O operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices and the storage system 102 are possible.

Additional examples of processing platforms utilized to implement host devices 101 and/or storage system 102 in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types and arrangements of system components such as host devices 101, storage system 102, network 104, storage devices 106, storage volumes 107, storage controller 108, schedule-based snapshot module 122, schedule processing logic 124 and snapshot layer 126 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

An exemplary process utilizing schedule-based snapshot module 122, schedule processing logic 124 and/or snapshot layer 126 will be described in more detail with reference to FIGS. 4 and 5.

A converged infrastructure or an application cluster, which uses, for example, NAS or SANs, can run a large number and variety of applications. Each of these applications can have different levels of importance or criticality in the application cluster. In these situations, applications may be served by storage solutions in the backend (such as, for example ScaleIO™) which is accessed by the cluster nodes over SAN or NAS. When an application running on a cluster accesses a file, the file access delay on the storage array directly affects application performance. In these situations, recently accessed data may be cached in order to give quick repeat access to the same data.

Figure 2:
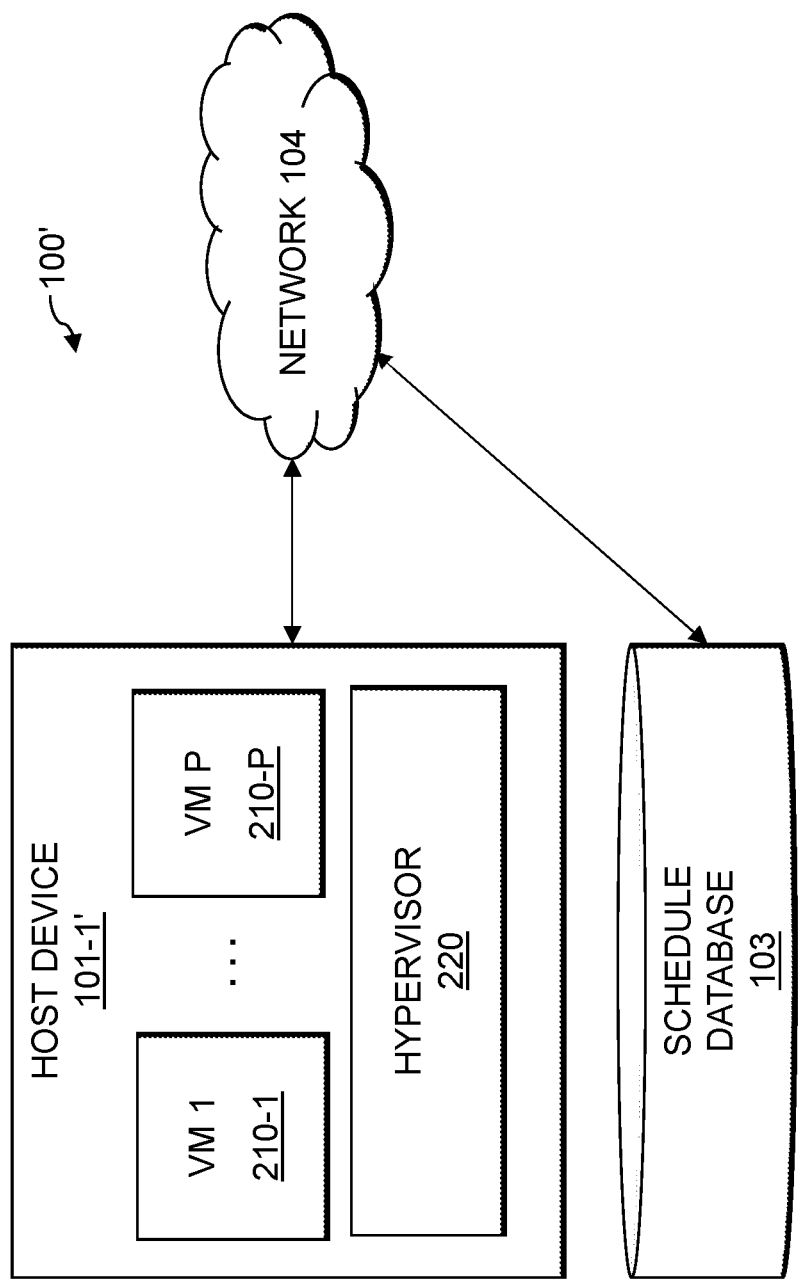
FIG. 2 illustrates a variation of a portion of the information processing system of FIG. 1, in accordance with an illustrative embodiment.

FIG. 2 illustrates a variation 100' of a portion of the information processing system 100 of FIG. 1, according to some embodiments of the disclosure. In the example of FIG. 2, the representative host device 101-1' comprises a server running multiple virtual machines 210-1 through 210-P through a hypervisor 220. The hypervisor 220 may comprise one or more MPIO drivers that are configured to control delivery of I/O operations from the host device 101 to the storage system 102 over selected ones of a plurality of paths through the network 104, as described above. The other elements of FIG. 2 are implemented in a similar manner as the embodiment of FIG. 1, as would be apparent to a person of ordinary skill in the art.

FIG. 3 is a sample table 300 illustrating a number of exemplary storage system metrics, in accordance with an illustrative embodiment. The sample table 300 indicates, for each storage system metric, a metric short name and a metric description. In the example of FIG. 3, the considered storage system metrics that evaluate the overall state of the storage system comprise: (i) a current storage pool usage metric, P, (ii) an input/output metric, R, of at least one storage resource in at least a portion of the storage system, (iii) a measure, DS, of snapshots in a destroying state, and/or (iv) a measure, S, of a number of created snapshots in the storage space of the system.

As shown in FIG. 3, the current storage pool usage metric, P, comprises an amount of storage space allocated relative to a capacity of storage space in the storage system (e.g., allocated space in the storage pool/capacity of the storage pool); the input/output metric, R, comprises a number of input/output operations of the at least one storage resource of the storage system relative to a number of input/output operations of the storage system; the measure, DS, of snapshots in the destroying state comprises a number of snapshots in the destroying state relative to a total number of created snapshots (e.g., a ratio of a number of ongoing destroying snapshots/a number of created snapshots); and the measure, S, of the number of created snapshots comprises the total number of created snapshots relative to a maximum number of created snapshots (e.g., a ratio of the number of snapshots/a maximum allowed number of snapshots). In at least some embodiments, the four exemplary storage system metrics P, R, DS and S, are provided by the storage system 102 and vary in a range between 0 and 1.

In one or more embodiments, the disclosed techniques for dynamic snapshot scheduling monitor one or more of the storage system metrics P, R, DS and S and adapt the snapshot schedule frequency, in at least some embodiments, within the configured or default snapshot schedule range (e.g., between a minimum frequency specified by the user, $F_{min}$, and a maximum frequency specified by the user, $F_{max}$).

As discussed further below, for example, in conjunction with FIGS. 4 and 5, the determined adjustment to the frequency comprises an increase of the frequency in response to an increase of the metrics P, DS and S. For example, a newly created snapshot does not require too much storage space in the storage system 102. The storage of data in the storage system 102, however, requires additional storage space in the storage system 102. Thus, the frequency of the snapshot schedule may be increased (e.g., snapshots are performed less often) when the current storage pool usage metric, P, is increasing. Likewise, snapshots in the destroying state consume significant resources of the storage system 102. Thus, the frequency of the snapshot schedule may be increased (e.g., snapshots are performed less often) when the destroying state metric, DS, is increasing. It is noted that a destroying state comprises a process to remove snapshots that are no longer needed. In addition, the frequency of the snapshot schedule may be increased (e.g., snapshots are performed less often) when the measure, S, of the number of created snapshots is increasing.

In addition, the adjustment to the frequency comprises a decrease of the frequency in response to an increase in the metric, R, as discussed further below, for example, in conjunction with FIGS. 4 and 5. The number of I/O operations generally correlates with the scope of data changes in the storage system 102. Thus, the frequency of the snapshot schedule may be decreased (e.g., snapshots are performed more often) when the I/O metric, R, is increasing.

In some embodiments, the disclosed dynamic snapshot scheduling techniques initially evaluate the current storage pool usage metric, P, and the number of created snapshots measure, S. If the number of created snapshots measure, S, has reached a snapshot limit or if the current storage pool usage metric, P, is over a snapshot deletion threshold (illustratively denoted herein as a pool usage watermark (PWM)) then the schedule frequency may be set to a maximum value (e.g., so that snapshots are performed as infrequently as possible within the schedule range). Otherwise, the actual schedule frequency ($F_{actual}$) will float within the configured or default snapshot schedule range (e.g., between the minimum frequency, $F_{min}$, and the maximum frequency, $F_{max}$). The float percentage may be determined using the four exemplary storage system metrics. Assume that the increase coefficient of $F_{actual}$ is $\gamma_1$, so the increment of $F_{actual}$ may be expressed, as follows:

$$\Delta F_{increase} = (F_{max} - F_{min}) \times \gamma_1,$$

where $\gamma_1$ varies between 0 and 1.

When $\gamma_1$ is impacted by the current storage pool usage metric, P, the destroying state measure, DS, and/or the number of created snapshots measure, S, $F_{actual}$ will be set to the maximum value, as follows:

$$F_{actual1} = F_{min} + (F_{max} - F_{min}) \times \gamma_1.$$

Similarly, as noted above, $F_{actual}$ will decrease when there is an increase in the input/output metric, R. Thus, if the increase coefficient of $F_{actual}$ is expressed as $\gamma_2$, then the increment of $F_{actual}$ may be expressed, as follows:

$$\Delta F_{decrease} = -(F_{max} - F_{min}) \times \gamma_2,$$

where $\gamma_2$ varies between 0 and 1.

When $\gamma_2$ is impacted by the input/output metric, R, $\gamma_1$ is set to a value of one, and $F_{actual}$ may be set to the minimum, as follows:

$$F_{actual2} = F_{max} - (F_{max} - F_{min}) \times \gamma_2.$$

In addition, when $\gamma_1$ and $\gamma_2$ affect $F_{actual}$ at same time, the intermediate of $F_{actual1}$ and $F_{actual2}$ is obtained, as follows:

$$F_{actual} = (F_{max} + F_{min} + (F_{max} - F_{min}) \times (\gamma_2 - \gamma_1)) \times \frac{1}{2},$$

and $\gamma_1$ may be impacted by the current storage pool usage metric, P, the destroying state measure, DS, and the number of created snapshots measure, S. $\gamma_2$ is impacted by the input/output metric, R. $\gamma_1$ and $\gamma_2$ may be computed from the storage system metrics, as follows:

$$\gamma_1 = \frac{1}{3} \times (P + DS + S);$$

$$\gamma_2 = R.$$

If, for example, the current storage pool usage metric, P, is omitted in a given implementation, the computation of $\gamma_1$ and $\gamma_2$ may be performed by omitting the current storage pool usage metric, P, from the computation of $\gamma_1$, and the (⅓) multiplier employed to compute $\gamma_1$ may be replaced with a multiplier of (½).

Figure 4:
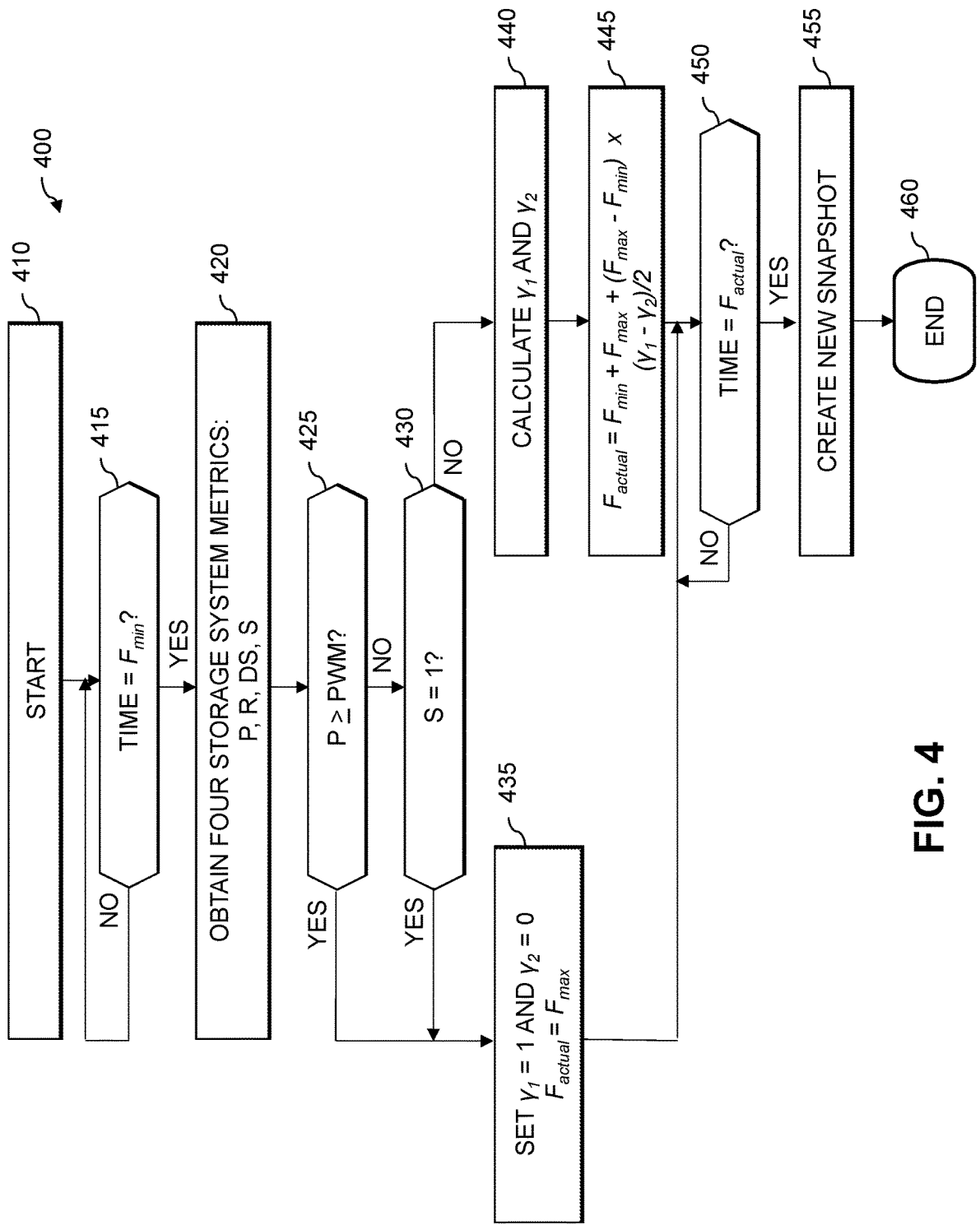
FIG. 4 is a flow chart illustrating an exemplary implementation of a snapshot scheduling process that uses storage system metrics, in accordance with an illustrative embodiment.

FIG. 4 is a flow chart illustrating an exemplary implementation of a snapshot scheduling process 400 that uses storage system metrics, in accordance with an illustrative embodiment. In the example of FIG. 4, the snapshot scheduling process 400 is initiated in step 410 and a test is performed in step 415 to determine if the current time indicates that the minimum frequency, $F_{min}$, has been reached.

Once it is determined in step 415 that the minimum frequency, $F_{min}$, has been reached, the four exemplary storage system metrics (P, R, DS, S) are obtained in step 420. A test is performed in step 425 to determine if the current storage pool usage metric, P, is greater than or equal to the PWM snapshot deletion threshold. A further test is performed in step 430 to determine if the number of created snapshots measure, S, is equal to a value of one.

If it is determined in step 425 that the current storage pool usage metric, P, is greater than or equal to the PWM threshold, or if it is determined in step 430 that the number of created snapshots measure, S, is equal to a value of one, then $\gamma_1$ and $\gamma_2$ are set to values of 1 and 0, respectively, and $F_{actual}$ is set to $F_{max}$ in step 435.

If, however, it was determined in step 425 that the current storage pool usage metric, P, is not greater than or equal to the PWM threshold, and in step 430 that the number of created snapshots measure, S, is not equal to a value of one, then $\gamma_1$ and $\gamma_2$ are calculated in step 440 using the following expression, provided above:

$$\gamma_1 = \frac{1}{3} \times (P + DS + S);$$

$$\gamma_2 = R.$$

In step 445, the actual frequency, $F_{actual}$, is determined, as follows:

$$F_{actual} = F_{min} + F_{max} + (F_{max} - F_{min}) \times (\gamma_2 - \gamma_1)) \times \frac{1}{2}.$$

A test is performed in step 450 to determine if the current time indicates that $F_{actual}$ has been reached. Once it is determined in step 450 that $F_{actual}$ has been reached, a new snapshot is created in step 455. The snapshot scheduling process 400 then ends at step 460.

FIG. 5 illustrates pseudo code for an exemplary storage-side I/O scheduling process 500, in accordance with an illustrative embodiment. In the example of FIG. 5, the exemplary storage-side I/O scheduling process 500 comprises the following four exemplary steps.

In step 1, when $F_{min}$ is reached, the four exemplary storage system metrics (P, R, DS, S) are obtained. In step 2, if the current storage pool usage metric, P, is greater than or equal to the PWM snapshot deletion threshold, then $\gamma_1=1$ and $\gamma_2=0$, so that $F_{actual}$ is set to $F_{max}$. Thereafter, the storage-side I/O scheduling process 500 goes to the end and waits for the next evaluation of time, or else the storage-side I/O scheduling process 500 goes to step 3.

In step 3, if S is equal to 1, then the storage-side I/O scheduling process 500 sets $\gamma_1=1$ and $\gamma_2=0$, so that $F_{actual}$ is set to $F_{max}$. Thereafter, the storage-side I/O scheduling process 500 goes to the end and waits for the next evaluation of time, or else the storage-side I/O scheduling process 500 goes to step 4.

In step 4, the storage-side I/O scheduling process 500 calculates $\gamma_1$ and $\gamma_2$, as follows:

$$\gamma_1 = \frac{1}{3} \times (P + DS + S);$$

$$\gamma_2 = R.$$

Thereafter, the storage-side I/O scheduling process 500 evaluates $F_{actual}$ and creates a new snapshot when $F_{actual}$ is reached.

Figure 6:
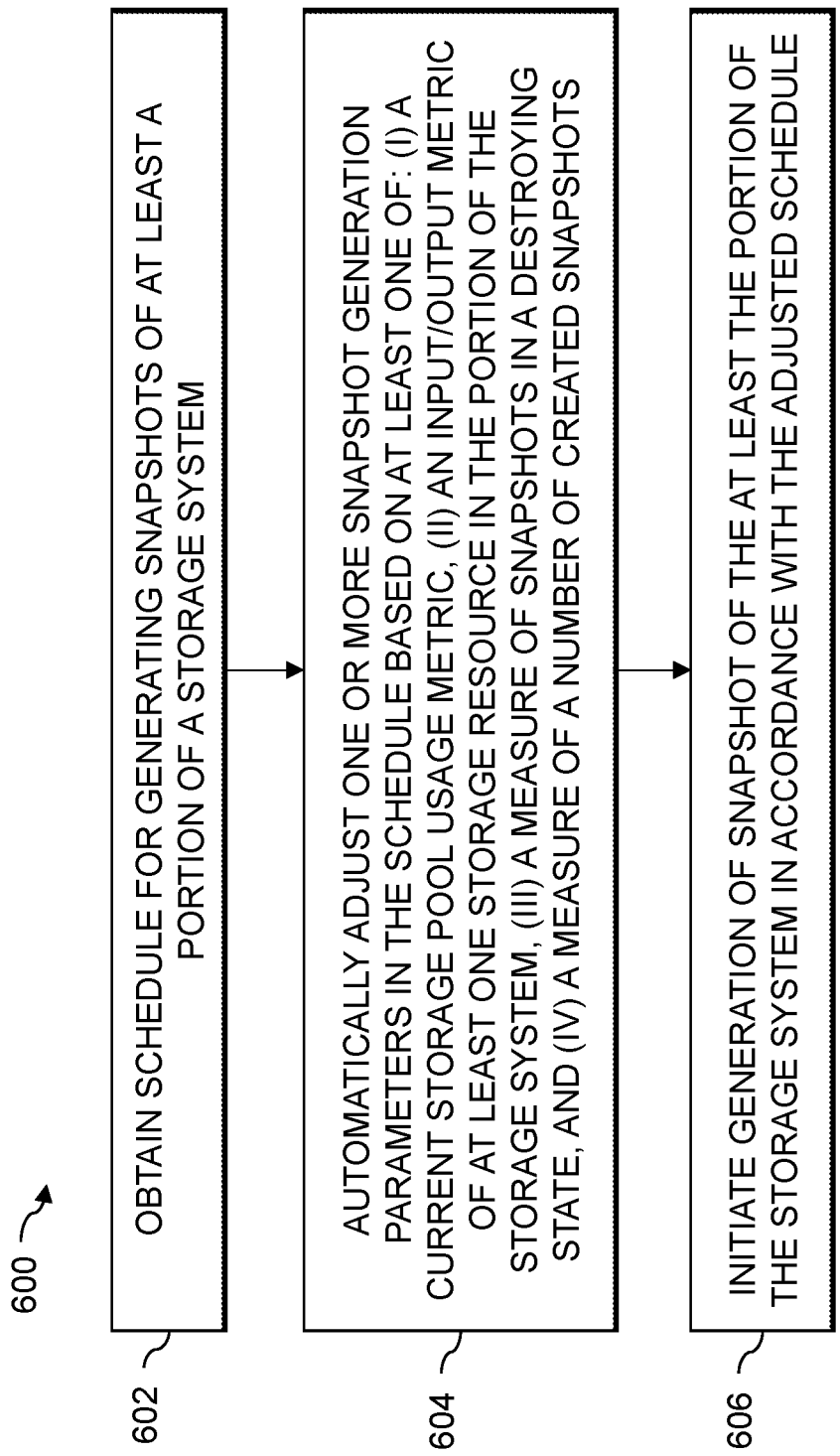
FIG. 6 is a flow chart illustrating an exemplary implementation of a process for dynamic snapshot scheduling using storage system metrics, in accordance with an illustrative embodiment.

FIG. 6 is a flow chart illustrating an exemplary implementation of a process 600 for dynamic snapshot scheduling using storage system metrics, in accordance with an illustrative embodiment. In the example of FIG. 6, the process 600 initially obtains a schedule in step 602 for generating snapshots of at least a portion of a storage system (e.g., at least one file system and/or at least one storage volume). In step 604, the process 600 automatically adjusts one or more snapshot generation parameters (e.g., a snapshot generation frequency) in the schedule based on at least one of: (i) a current storage pool usage metric (P), (ii) an input/output metric (R) of at least one storage resource in the portion of the storage system, (iii) a measure (DS) of snapshots in a destroying state, and (iv) a measure (S) of a number of created snapshots.

In step 606, a generation of a snapshot of the at least the portion of the storage system is initiated in accordance with the adjusted schedule.

The initial schedule may be established, in some embodiments, using a schedule specified by a user and/or a default schedule. In some embodiments, the snapshot generation frequency is maintained within a range specified by a user. The adjusting may comprise increasing the snapshot generation frequency in response to an increase of one or more of: the current storage pool usage metric, the measure of snapshots in the destroying state, and the measure of the number of created snapshots. The adjusting may also comprise decreasing the snapshot generation frequency in response to an increase of the input/output metric of the at least one storage resource in the portion of the storage system.

In some embodiments, (i) the current storage pool usage metric, (ii) the input/output metric of the at least one storage resource in the portion of the storage system, (iii) the measure of snapshots in the destroying state, and (iv) the measure of the number of created snapshots may be obtained from the storage system. The current storage pool usage metric may comprise an amount of storage space allocated relative to a capacity of storage space in the storage system. The input/output metric may comprise a number of input/output operations of the at least one storage resource of the storage system relative to a number of input/output operations of the storage system. The measure of snapshots in the destroying state may comprise a number of snapshots in the destroying state relative to a total number of created snapshots. The measure of the number of created snapshots may comprise the total number of created snapshots relative to a maximum number of created snapshots.

The particular processing operations and other network functionality described in conjunction with the pseudo code of FIG. 5 and the flow diagrams of FIGS. 4 and 6 are presented by way of illustrative example only, and should not be construed as limiting the scope of the disclosure in any way. Alternative embodiments can use other types of processing operations to dynamically schedule snapshots using storage system metrics. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In addition, while one or more exemplary embodiments implement the disclosed dynamic snapshot scheduling functionality in the storage system 102, in one or more alternate embodiments, at least a portion of the disclosed dynamic snapshot scheduling functionality may be implemented in one or more of the host devices 101, or on another dedicated device.

Consider an example, where a user has created a snapshot schedule applied to a grouping of five file systems (fs_0 through fs_4) and five LUNs (lun_0 through lun_4) with the following parameters: $F_{min}$=2H (hours), and $F_{max}$=6H. Assume that at a time of $F_{min}$, the following parameter values for each storage resource are observed:

| Resource | P | DS | S | R | $F_{actual}$ |
|---|---|---|---|---|---|
| fs_0 | 0.1 | 0.005 | 0.05 | 0 | 4.103333 |
| fs_1 | 0.1 | 0.005 | 0.05 | 0.007752 | 4.087829 |
| fs_2 | 0.1 | 0.005 | 0.05 | 0 | 4.103333 |
| fs_3 | 0.1 | 0.005 | 0.05 | 0.775194 | 2.552946 |
| fs_4 | 0.1 | 0.005 | 0.05 | 0.155039 | 3.793256 |
| lun_0 | 0.1 | 0.005 | 0.05 | 0.015504 | 4.072326 |
| lun_1 | 0.1 | 0.005 | 0.05 | 0 | 4.103333 |
| lun_2 | 0.1 | 0.005 | 0.05 | 0.007752 | 4.087829 |
| lun_3 | 0.1 | 0.005 | 0.05 | 0 | 4.103333 |
| lun_4 | 0.1 | 0.005 | 0.05 | 0.03876 | 4.025814 |

It is noted that the values of one or more of the four exemplary storage system metrics (P, DS, S and R) may become different over time. It is expected, for example, that the input/output metric, R, will be different for each storage resource, by virtue of the ratio. As shown in the above table, the current storage pool usage metric, P, the destroying state measure, DS, and the number of created snapshots measure, S, are all relatively low. Thus, under such conditions, the snapshot frequency will be set according to the values of the four exemplary storage system metrics (P, DS, S and R).

Consider another example, where a user has created a snapshot schedule applied to a grouping of the same five file systems (fs) and five LUNs with the following parameters: $F_{min}$=2H (hours), and $F_{max}$=6H, where the snapshot deletion threshold is set to 0.9. Assume that at a time of $F_{min}$, the following parameter values for each storage resource are observed:

| Resource | P | DS | S | R | $F_{actual}$ |
|---|---|---|---|---|---|
| fs_0 | 0.9 | 0.2 | 0.4 | 0.015152 | 6 |
| fs_1 | 0.9 | 0.2 | 0.4 | 0.066667 | 6 |
| fs_2 | 0.9 | 0.2 | 0.4 | 0.151515 | 6 |
| fs_3 | 0.9 | 0.2 | 0.4 | 0.375758 | 6 |
| fs_4 | 0.9 | 0.2 | 0.4 | 0.133333 | 6 |
| lun_0 | 0.9 | 0.2 | 0.4 | 0.006061 | 6 |
| lun_1 | 0.9 | 0.2 | 0.4 | 0.166667 | 6 |
| lun_2 | 0.9 | 0.2 | 0.4 | 0.00303 | 6 |
| lun_3 | 0.9 | 0.2 | 0.4 | 0.066667 | 6 |
| lun_4 | 0.9 | 0.2 | 0.4 | 0.015152 | 6 |

Since the current storage pool usage metric, P, is over the snapshot deletion threshold, the storage system 102 will start to automatically delete snapshots. Thus, the scheduled frequency for the ten storage resources will be set to the maximum frequency, $F_{max}$, of 6H.

By utilizing the above-described dynamic snapshot scheduling techniques, snapshots are automatically generated based on one or more of the monitored storage system metrics. The foregoing applications and associated embodiments should be considered as illustrative only, and numerous other embodiments can be configured using the techniques disclosed herein, in a wide variety of different applications.

It should also be understood that the disclosed dynamic snapshot scheduling techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for dynamic snapshot scheduling using storage system metrics may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based dynamic snapshot scheduling engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based dynamic snapshot scheduling platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
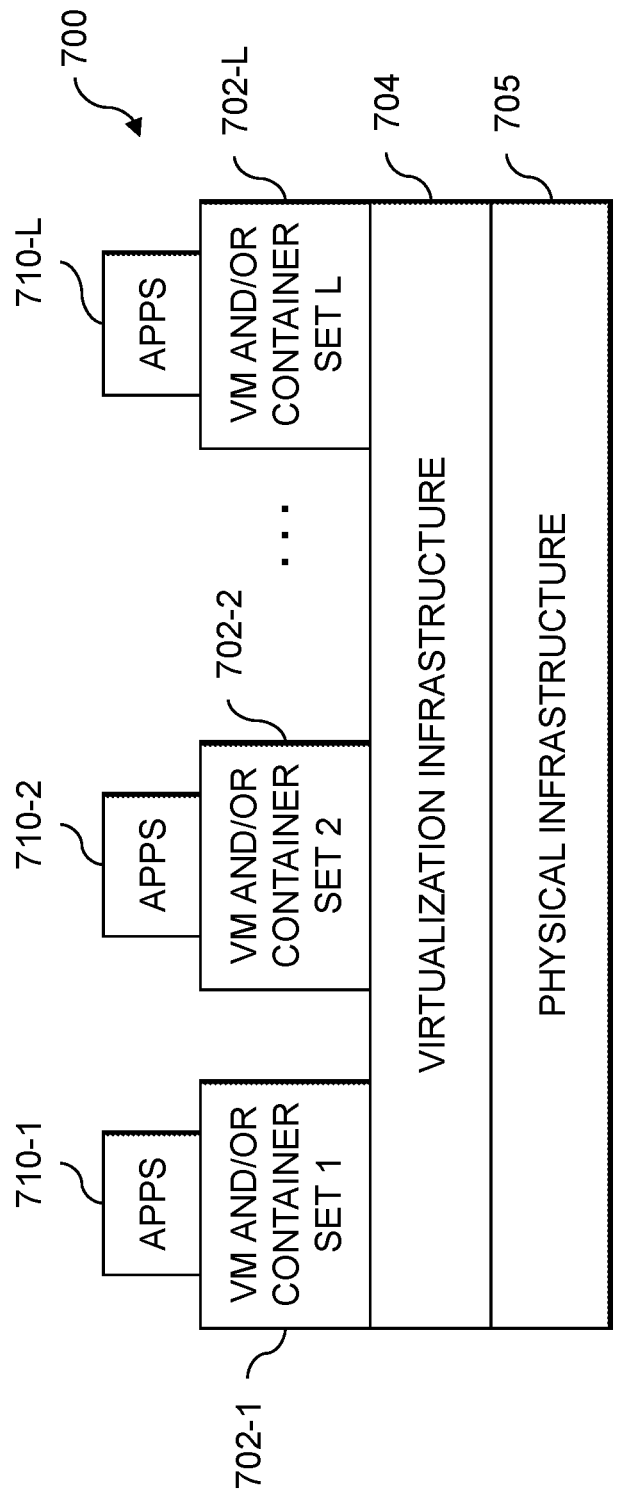
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide dynamic snapshot scheduling functionality of the type described above for one or more processes running on a given one of the VMs. For example, each of the VMs can implement dynamic snapshot scheduling control logic and associated storage system metric monitoring for providing dynamic snapshot scheduling functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide dynamic snapshot scheduling functionality of the type described above for one or more processes running on different ones of the containers. For example, a container host device supporting multiple containers of one or more container sets can implement one or more instances of dynamic snapshot scheduling control logic and associated storage system metric monitoring for providing dynamic snapshot scheduling functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
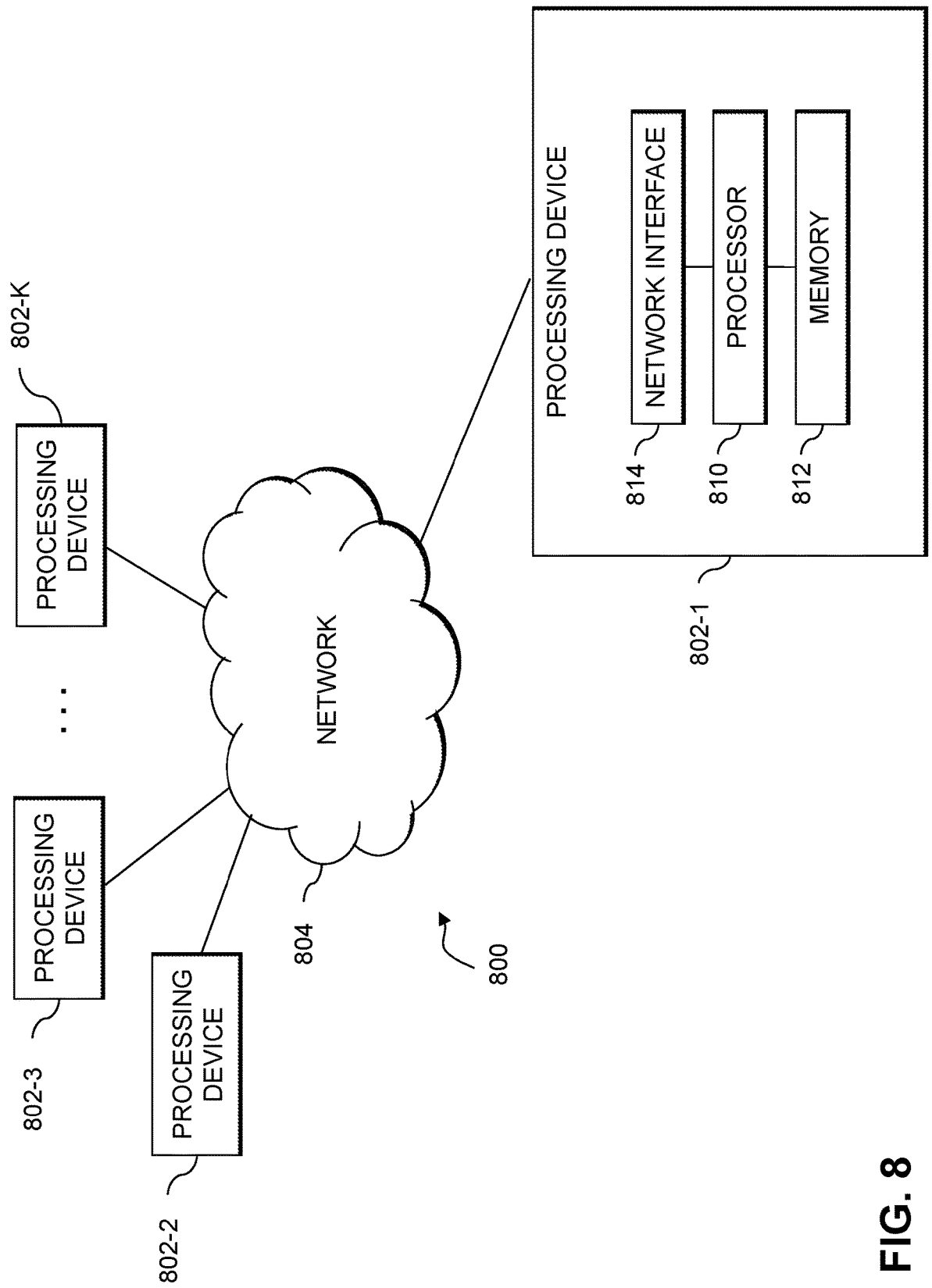
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a schedule for generating snapshots of at least a portion of a storage system;

automatically adjusting one or more snapshot generation parameters in the schedule based at least in part on at least one of: (i) a current storage pool usage metric that is based at least in part on an amount of storage space allocated relative to a capacity of storage space in the storage system, (ii) an input/output metric of at least one storage resource in the portion of the storage system, wherein the input/output metric is based at least in part on a number of input/output operations of the at least one storage resource of the storage system relative to a number of input/output operations of the storage system, (iii) a measure of snapshots in a destroying state that is based at least in part on a number of snapshots in the destroying state relative to a total number of created snapshots, and (iv) a measure of a number of created snapshots that is based at least in part on the total number of created snapshots relative to a limit on a number of created snapshots, wherein the one or more snapshot generation parameters comprise a snapshot generation frequency and wherein the adjusting comprises decreasing the snapshot generation frequency in response to an increase of the input/output metric of the at least one storage resource in the portion of the storage system; and initiating a generation of a snapshot of the at least the portion of the storage system in accordance with the adjusted schedule;

wherein the method is performed by at least one processing device comprising a processor coupled to a memory.

2. The method of claim 1, wherein the schedule is initially set to a default schedule.

3. The method of claim 1, wherein the schedule is initially established using a schedule specified by a user.

4. The method of claim 1, wherein the portion of the storage system comprises one or more of at least one file system and at least one storage volume.

5. The method of claim 1, wherein the snapshot generation frequency is maintained within a range specified by a user.

6. The method of claim 1, wherein the adjusting comprises increasing the snapshot generation frequency in response to an increase of one or more of: the current storage pool usage metric, the measure of snapshots in the destroying state, and the measure of the number of created snapshots.

7. The method of claim 1, wherein: (i) the current storage pool usage metric, (ii) the input/output metric of the at least one storage resource in the portion of the storage system, (iii) the measure of snapshots in the destroying state, and (iv) the measure of the number of created snapshots are obtained from the storage system.

8. An apparatus comprising:

at least one processing device comprising a processor coupled to a memory;

the at least one processing device being configured to implement the following steps:

obtaining a schedule for generating snapshots of at least a portion of a storage system;

automatically adjusting one or more snapshot generation parameters in the schedule based at least in part on at least one of: (i) a current storage pool usage metric that is based at least in part on an amount of storage space allocated relative to a capacity of storage space in the storage system, (ii) an input/output metric of at least one storage resource in the portion of the storage system, wherein the input/output metric is based at least in part on a number of input/output operations of the at least one storage resource of the storage system relative to a number of input/output operations of the storage system, (iii) a measure of snapshots in a destroying state that is based at least in part on a number of snapshots in the destroying state relative to a total number of created snapshots, and (iv) a measure of a number of created snapshots that is based at least in part on the total number of created snapshots relative to a limit on a number of created snapshots, wherein the one or more snapshot generation parameters comprise a snapshot generation frequency and wherein the adjusting comprises decreasing the snapshot generation frequency in response to an increase of the input/output metric of the at least one storage resource in the portion of the storage system; and initiating a generation of a snapshot of the at least the portion of the storage system in accordance with the adjusted schedule.

9. The apparatus of claim 8, wherein the schedule is initially set using one or more of a schedule specified by a user and a default schedule.

10. The apparatus of claim 8, wherein the snapshot generation frequency is maintained within a range specified by a user.

11. The apparatus of claim 8, wherein the adjusting comprises increasing the snapshot generation frequency in response to an increase of one or more of: the current storage pool usage metric, the measure of snapshots in the destroying state, and the measure of the number of created snapshots.

12. The apparatus of claim 8, wherein: (i) the current storage pool usage metric, (ii) the input/output metric of the at least one storage resource in the portion of the storage system, (iii) the measure of snapshots in the destroying state, and (iv) the measure of the number of created snapshots are obtained from the storage system.

13. A non-transitory processor-readable storage medium having stored therein program code of one or more software programs, wherein the program code when executed by at least one processing device causes the at least one processing device to perform the following steps:

obtaining a schedule for generating snapshots of at least a portion of a storage system;

automatically adjusting one or more snapshot generation parameters in the schedule based at least in part on at least one of: (i) a current storage pool usage metric that is based at least in part on an amount of storage space allocated relative to a capacity of storage space in the storage system, (ii) an input/output metric of at least one storage resource in the portion of the storage system, wherein the input/output metric is based at least in part on a number of input/output operations of the at least one storage resource of the storage system relative to a number of input/output operations of the storage system, (iii) a measure of snapshots in a destroying state that is based at least in part on a number of snapshots in the destroying state relative to a total number of created snapshots, and (iv) a measure of a number of created snapshots that is based at least in part on the total number of created snapshots relative to a limit on a number of created snapshots, wherein the one or more snapshot generation parameters comprise a snapshot generation frequency and wherein the adjusting comprises decreasing the snapshot generation frequency in response to an increase of the input/output metric of the at least one storage resource in the portion of the storage system; and initiating a generation of a snapshot of the at least the portion of the storage system in accordance with the adjusted schedule.

14. The non-transitory processor-readable storage medium of claim 13, wherein the schedule is initially set using one or more of a schedule specified by a user and a default schedule.

15. The non-transitory processor-readable storage medium of claim 13, wherein the snapshot generation frequency is maintained within a range specified by a user.

16. The non-transitory processor-readable storage medium of claim 13, wherein the adjusting comprises increasing the snapshot generation frequency in response to an increase of one or more of: the current storage pool usage metric, the measure of snapshots in the destroying state, and the measure of the number of created snapshots.

17. The method of claim 1, wherein the adjusting comprises increasing the snapshot generation frequency in response to the current storage pool usage metric exceeding a designated pool usage threshold.

18. The apparatus of claim 8, wherein the adjusting comprises increasing the snapshot generation frequency in response to the current storage pool usage metric exceeding a designated pool usage threshold.

19. The non-transitory processor-readable storage medium of claim 13, wherein the adjusting comprises increasing the snapshot generation frequency in response to the current storage pool usage metric exceeding a designated pool usage threshold.

20. The non-transitory processor-readable storage medium of claim 13, wherein: (i) the current storage pool usage metric, (ii) the input/output metric of the at least one storage resource in the portion of the storage system, (iii) the measure of snapshots in the destroying state, and (iv) the measure of the number of created snapshots are obtained from the storage system.

* * * * *